(12) United States Patent
Canter et al.

(10) Patent No.: US 9,292,993 B2
(45) Date of Patent: Mar. 22, 2016

(54) METHOD FOR AUTOMATED PLANOGRAM PROGRAMMING IN A VENDING MACHINE

(75) Inventors: James M. Canter, Austin, TX (US);
William C. Royal, Jr., Oak Ridge, NC (US); Victor Partyshev, Kiev (UA); Troy Doom, North Augusta, SC (US); Bryan W. Godwin, Round Rock, TX (US)

(73) Assignee: CRANE MERCHANDISING SYSTEMS, INC., Bridgeton, MO (US)

( * ) Notice: Subject to any disclaimer, the term of this patent is extended or adjusted under 35 U.S.C. 154(b) by 755 days.

(21) Appl. No.: 13/559,376

(22) Filed: Jul. 26, 2012

(65) Prior Publication Data

US 2013/0144432 A1     Jun. 6, 2013

Related U.S. Application Data

(60) Provisional application No. 61/511,881, filed on Jul. 26, 2011.

(51) Int. Cl.
| G07F 9/02 | (2006.01) |
| G07F 9/00 | (2006.01) |
| G07F 11/00 | (2006.01) |

(52) U.S. Cl.
CPC ............... *G07F 9/006* (2013.01); *G07F 9/026* (2013.01); *G07F 11/002* (2013.01)

(58) Field of Classification Search
CPC ......... G07F 7/069; G07F 11/42; G07F 9/026; G07F 9/02; G07F 9/08
See application file for complete search history.

(56) References Cited

U.S. PATENT DOCUMENTS

| 3,344,953 A | 10/1967 | Krakauer et al. |
| 3,901,366 A | 8/1975 | Schuller et al. |
| 4,094,440 A | 6/1978 | Lotspeich |
| 4,608,487 A * | 8/1986 | Awane et al. ................. 235/383 |
| 4,834,231 A * | 5/1989 | Awane et al. ................. 194/217 |

(Continued)

FOREIGN PATENT DOCUMENTS

| EP | 0 343 933 A2 | 11/1989 |
| EP | 0 470 846 A2 | 2/1992 |

OTHER PUBLICATIONS

Extended European Search Report dated Mar. 25, 2015 in connection with European Patent Application No. 12818353.0-1958, 6 pages.

(Continued)

*Primary Examiner* — Timothy Waggoner

(57) ABSTRACT

Automatic planogram programming for a glass front snack or cold drink vending machine is accomplished using tray, product and price barcodes, each preferably a different type of barcode. Trays within the vending machine are labeled with unique barcodes, and a set of price barcodes for predetermined prices is provided together with a USB-connected scanner. The barcode label affixed to any tray is scanned by the route driver. The UPC/EAN barcodes on products are then scanned for each selection progressing across the tray, together with a price barcode for the first selection and each subsequent selection having a different price from the prior selection on the tray. Planogram data for the tray may be reviewed and corrected on a customer interface display for the vending machine before moving on to another tray, with the trays programmed in any order. The planogram for the entire vending machine is quickly and accurately programmed.

20 Claims, 4 Drawing Sheets

(56) References Cited

U.S. PATENT DOCUMENTS

| | | | |
|---|---|---|---|
| 5,027,283 A * | 6/1991 | Phillips et al. | 700/236 |
| 5,272,321 A * | 12/1993 | Otsuka et al. | 235/381 |
| 5,303,844 A * | 4/1994 | Muehlberger | 221/1 |
| 5,375,737 A | 12/1994 | Ficken | |
| 5,698,934 A * | 12/1997 | Jin et al. | 313/309 |
| 6,494,342 B1 | 12/2002 | Wittern, III et al. | |
| 6,840,400 B2 | 1/2005 | Park | |
| 7,251,546 B2 * | 7/2007 | Chirnomas | 700/242 |
| 7,467,093 B1 * | 12/2008 | Newton et al. | 705/3 |
| 2006/0102645 A1 | 5/2006 | Walker et al. | |
| 2007/0235465 A1 | 10/2007 | Walker et al. | |
| 2008/0243566 A1 | 10/2008 | Godwin | |
| 2010/0138037 A1 | 6/2010 | Adelberg et al. | |

OTHER PUBLICATIONS

International Search Report dated Oct. 15, 2012 in connection with International Patent Application No. PCT/US2012/048246, 4 pages.
Written Opinion of International Searching Authority dated Oct. 15, 2012 in connection with International Patent Application No. PCT/US2012/048246, 8 pages.
U.S. Office Action dated Jan. 11, 2016 in connection with U.S. Appl. No. 14/711,659, 9 pages.

* cited by examiner

METHOD FOR AUTOMATED PLANOGRAM PROGRAMMING IN A VENDING MACHINE

CROSS-REFERENCE TO RELATED APPLICATIONS

This application claims priority to U.S. Provisional Patent Application Ser. No. 61/511,881 entitled METHOD FOR AUTOMATED PLANOGRAM PROGRAMMING IN A VENDING MACHINE and filed on Jul. 26, 2011. The content of the above-identified patent document is incorporated herein by reference.

TECHNICAL FIELD

The present application relates generally to planogram programming in vending machines and, more specifically, to automatically and dynamically programming a vending machine planogram using barcodes.

BACKGROUND

Vending machines offer unattended sales of commodities such as snacks, canned or bottled beverages, or any of a variety of other articles. When placing a vending machine into service for the first time, a planogram (space-to-sales mapping) defining the which types of products available for vending are loaded within which "selections" or product positions. Similarly, when altering the products stocked in a vending machine or the distribution of products within the vending machine, the planogram must be updated.

The primary purpose of planogram programming, used primarily in glass front snack or cold drink vending machines, is to map products (referring to the type/brand of product) to selections (referring to the product column position in which a particular product is loaded and from which the product is vended). Multiple selections may contain the same product. Thus, for example, in a glass front snack vending machine, two selections may both contain Kit Kat candy bars. Selections within a planogram are typically identified two or three alphanumeric characters, the first identifying a "tray" or "shelf" (a horizontal row or subgroup of machine selections that includes all selections within that row) with selections on a row normally identified by the increasing (but not necessarily continuous) alphanumeric characters when going from left to right. Planograms may be necessary to establish proper pricing for different products within different selections.

Manually programming a complete vending machine planogram—or even a significant revision to an existing planogram—is both time consuming and error-prone. As a result, planogram programming is not typically done.

In addition to manual planogram programming, vending machine operators may "pre-configure" machines via enterprise-level software, with the resulting machine configuration data downloaded via a network or telemetry connectivity, or via a Data Exchange (DEX) handheld. However, such programming requires detailed, a priori knowledge of vending machine brand/type/model (e.g., CMS/Merchant/6) and tray/shelf configurations (number of trays, number of positions per tray, etc.).

There is, therefore, a need in the art for improved planogram programming in vending machines.

SUMMARY

Automatic planogram programming for a glass front snack or cold drink vending machine is accomplished using tray, product and price barcodes, each preferably a different type of barcode. Trays within the vending machine are labeled with unique barcodes, and a set of price barcodes for predetermined prices is provided together with a USB-connected scanner. The barcode label affixed to any tray is scanned by the route driver. The UPC/EAN barcodes on products are then scanned for each selection progressing across the tray, together with a price barcode for the first selection and each subsequent selection having a different price from the prior selection on the tray. Planogram data for the tray may be reviewed and corrected on a customer interface display for the vending machine before moving on to another tray, with the trays programmed in any order. The planogram for the entire vending machine is quickly and accurately programmed by the route driver, with different prices for individual products more easily supported.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
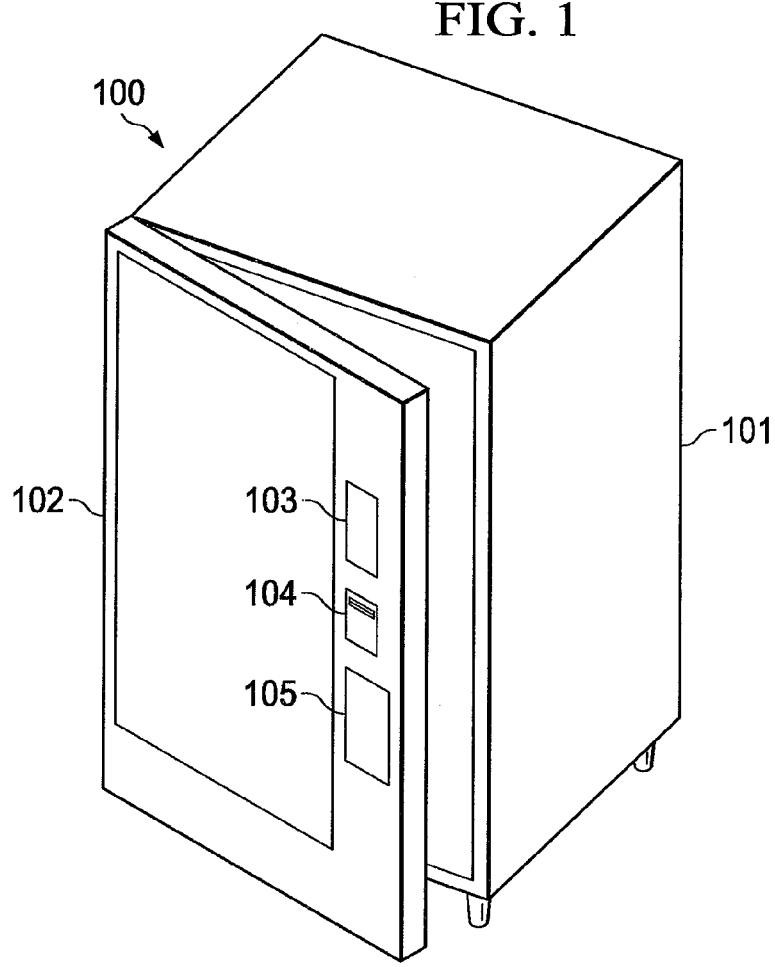
FIG. 1 is a simplified perspective view illustrating a vending machine implementing automatic planogram programming using product, tray and price barcodes according to one embodiment of the present disclosure.

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged vending machine currency handling system.

For efficient and effective business operations, vending machine operators (the company or entity that owns and sells products from the vending machine) require accurate sales data for specific products. Route drivers (the person, usually an employee of the operator responsible for many vending machines in several locations, that visits a vending machine on a regular basis to restock products, collect money, and tend to any other periodic needs for the vending machine) need to be able to service vending machines within a given period of time and have minimal time to program machine configuration (products, prices) during their normal routes. In fact, to simplify price programming, vending machines are routinely set to use the same price for all selections on a single tray, or for the entire vending machine, resulting in lost revenue.

In the present disclosure, barcode scanning is employed to automate planogram programming and simplify vending machine configuration procedures. Barcodes are an encoding of numeric or alphanumeric characters that are easily read by optical barcode scanners and decoded by electronic and/or automated means. Information is typically encoded in barcodes using one of a small set of standard encoding formats (symbologies) used in various industries, with computer peripheral optical scanners or "smart" phone cameras used to detect the barcode patterns for decoding. Two dimensional (matrix) barcodes such as quick response (QR) codes are encompassed by the present disclosure.

Commercially-available snack, cold drink, and food products likely to be sold in vending machines are already routinely distributed in product packages coded to uniquely identify the product with either Universal Product Code (UPC) based barcode data, with UPC-A and UPC-E barcode symbology formats being the most widely used formats in North America, or with European Article Number (EAN) based barcode data, commonly used to identify most products marketed in the European Union (EU) and Asian markets.

In addition, each vending machine in the present disclosure has a unique, machine-specific barcode used to uniquely identify the vending machine, preferably located (for example) inside the service door on an outward facing panel for ease of scanning. The vending machine barcode may also encode (or be used to lookup) brand/type/model and tray/shelf configuration information regarding the vending machine. Still further, each vending machine product tray in the present disclosure has a barcode indicating the tray position (and possibly the number of product columns in the tray). A laminated sheet of "standard" prices (for example, all prices ranging from $0.05 to, say, $3.00 in $0.05 increments), each with a corresponding barcode, is attached to inside of the service side of the machine, behind the service door. Provided with a universal serial bus (USB) hand scanner, this introduces a simplified and streamlined programming sequence minimizing route driver's need to interact with customer interface screen (or other devices) to manually enter data, and reduces both programming time and opportunity for error. In the majority of scenarios, the route driver is able to program the full vending machine planogram while stocking the vending machine, with prices, without ever being forced to interact with a touchscreen user interface between individual products.

FIG. 1 is a simplified perspective view illustrating a vending machine implementing automatic planogram programming using product, tray and price barcodes according to one embodiment of the present disclosure. Vending machine 100 includes a cabinet 101 and a service door 102 that, together, define an enclosure. In the exemplary embodiment illustrated, the service door 102 is pivotally mounted to the front of the cabinet 101 and extends all the way across the front face of the vending machine 100. In alternate designs, the service door may extend only part way across the front of the vending machine, or may be formed in two portions (of equal or unequal sizes) that swing open in opposite directions.

In the exemplary embodiment illustrated in FIG. 1, the service door 102 includes a customer user interface 103, illustrated as a touch screen liquid crystal display (LCD) display. A payment system 104 is mounted within the service door 102 and includes one or more of a bill validator, a coin acceptor and/or a credit or debit card reader. The payment system 104 receives currency, coins or other forms of payment from the customer and returns change as necessary. Finally, FIG. 1 depicts an access port 105 to a delivery receptacle mounted within the service door 102 or in the cabinet 101. The access port 105 may have a delivery door or other mechanical system (e.g., rotatable delivery receptacle open on one side) for controlling or restricting access by the customer into the delivery receptacle, the interior of the vending machine, or both. Those skilled in the art will recognize that in some vending machines, particularly helical coil snack vending machines, the access port 105 may be located near the bottom of the vending machine and extend across most of the width of the machine, below a large glass window allowing the contents within the cabinet to be viewed or a large liquid crystal display selectively presenting images of products available for vending or advertisements. Other vending machines, in particular beverage vending machines, have X-Y product retrieval and delivery mechanisms and a glass front or large liquid crystal display, but may include an access port 105 to the side as shown in FIG. 1, at a height convenient to the customer for product retrieval without bending over.

Figure 1A:
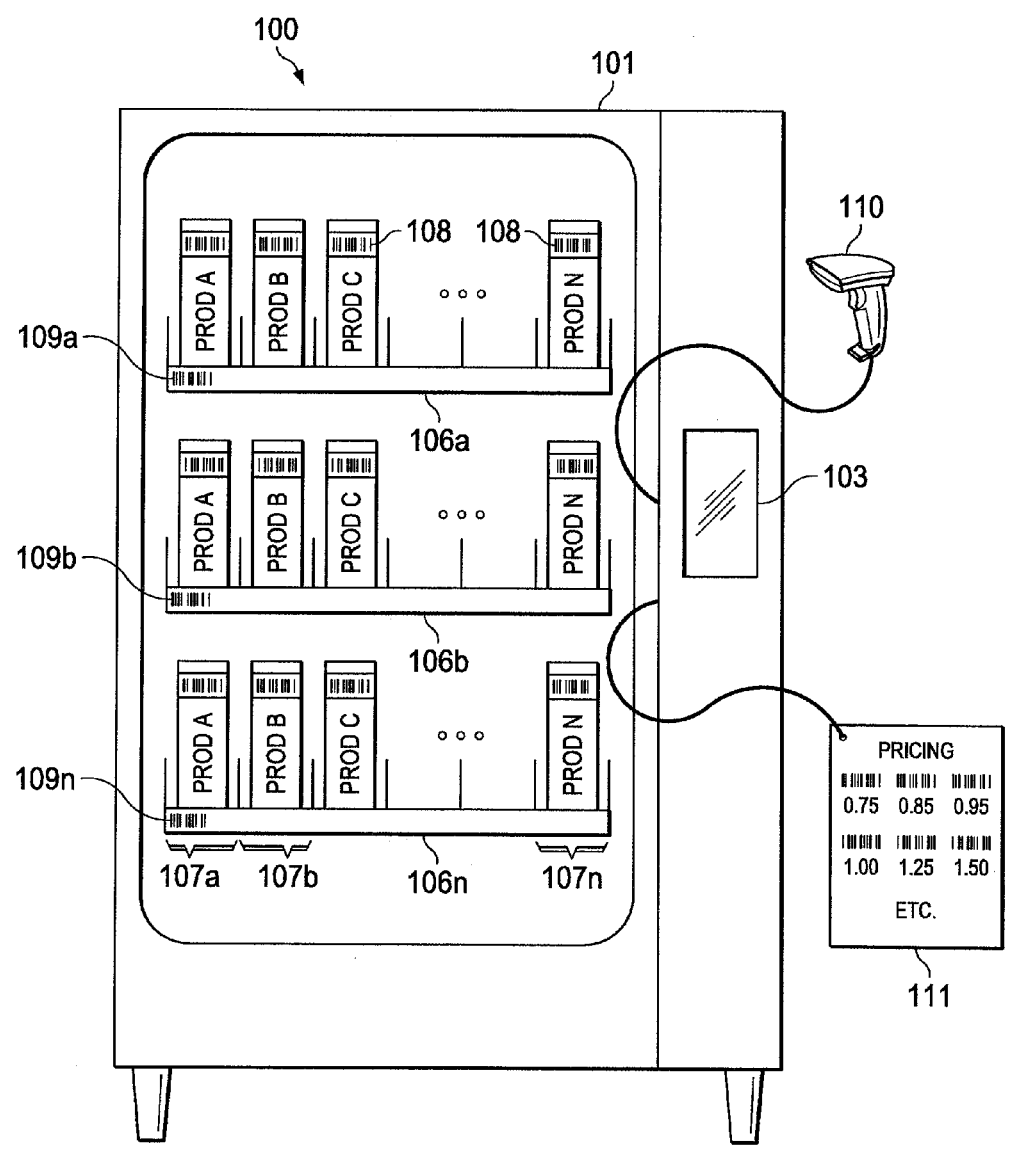
FIG. 1A is a simplified diagrammatic illustration of the vending machine of FIG. 1.

FIG. 1A is a simplified diagrammatic illustration of the vending machine 100 of FIG. 1. The vending machine cabinet 101 houses a plurality of product trays 106a, 106b, ... 106n, each including a plurality of product columns 107a, 107b, ... 107n. Each product within one of the product columns on a tray includes a UPC or EAN product code 108. Each product tray includes a unique barcode 109a, 109b, ... 109n identifying the tray location within the vending machine 100. The vending machine is assumed to have already been programmed during manufacturing with the correct configuration data: number of trays and number of selections on each tray, total number/positions of selections, coupling between selections on a tray (if required for large snack items), etc. If the vending machine configuration is changed in the field (e.g., one tray is replaced with another holding a different number of selections), those changes are presumed to have been correctly programmed into the vending machine. Alternatively, the barcode affixed to each product tray 106 may encode the number of selections for that tray, as well as any other configuration information. For instance, the type of each product column/selection on the tray (single or double helical coil for snack products or alternate product column for cold drinks) may be encoded by the barcode, to be used as a check in preventing incorrect product codes from being associated with the respective selection.

A handheld scanner 110 is provided for use with the vending machine 100. For example, a USB handheld scanner may be employed to leverage the integrated USB interface on contemporary vending machines, with a USB human interface device (HID) interface provided for sending barcode data as a keyboard input to the vending machine controller described below. Any of an abundance of currently available USB-connected handheld two-dimensional or three-dimensional barcode scanners may be employed, either "permanently" installed in (left within) the vending machine 100 or carried by route driver from machine to machine on the route.

Charge-coupled device (CCD)-based barcode scanners are inexpensive, commodity items like a personal computer (PC) keyboard or mouse, with a unit cost enabling each vending machine to be equipped with a "permanent" scanner to be left inside the machine. Alternatively, route drivers may be provided with more durable (but more expensive) and sophisticated devices that can be carried along the route and including barcode scanner as well as other functionality (e.g., wireless telemetry for transmitting planogram programming back to a network operations center). In any case, however, the scanner 110 should have a cord length long enough to reach the portion of a tray that is furthermost from the USB connection point.

As described above, a hard plastic or laminated price sheet 111 with printed numeric prices associated bar codes may be secured to the internal service area of the vending machine 100, using a lanyard as shown. In addition to nominal prices, each barcode may encode additional information such as a number of customer loyalty points awarded for purchase of a product at the respective price and/or a discount rate for multi-vend transactions.

Figure 3A:
FIGS. 3A through 3C are exemplary barcodes for use in a vending machine implementing automatic planogram programming using product, tray and price barcodes according to one embodiment of the present disclosure.
Figure 3B:
Figure 3C:

The tray barcodes and the price barcodes preferably use a symbology format other than the UPC or EAN formats. All commercially available barcode scanners support a wide variety of barcode formats. For a number of reasons, use of an alternate, non-UPC/non-EAN symbology (I2/5, code 128, etc.) for tray and price barcodes is preferred, including to help differentiate tray and price barcodes from product barcodes. Examples of the UPC-A (12 digit) barcode for vend products, an interleaved 2-of-5 (I2/5) format barcode (which requires an even number of digits) and a code 128 format barcode (which allows ASCII character encoding) are depicted in FIGS. 3A, 3B and 3C respectively. The symbology format for tray and price barcodes should be chosen based on ease of scanning given vending machine geometry, whether barcode decals can be easily generated and printed for tray codes, and the type of data that needs to be encoded (numeric, ASCII, long/short strings, etc.).

Figure 2:
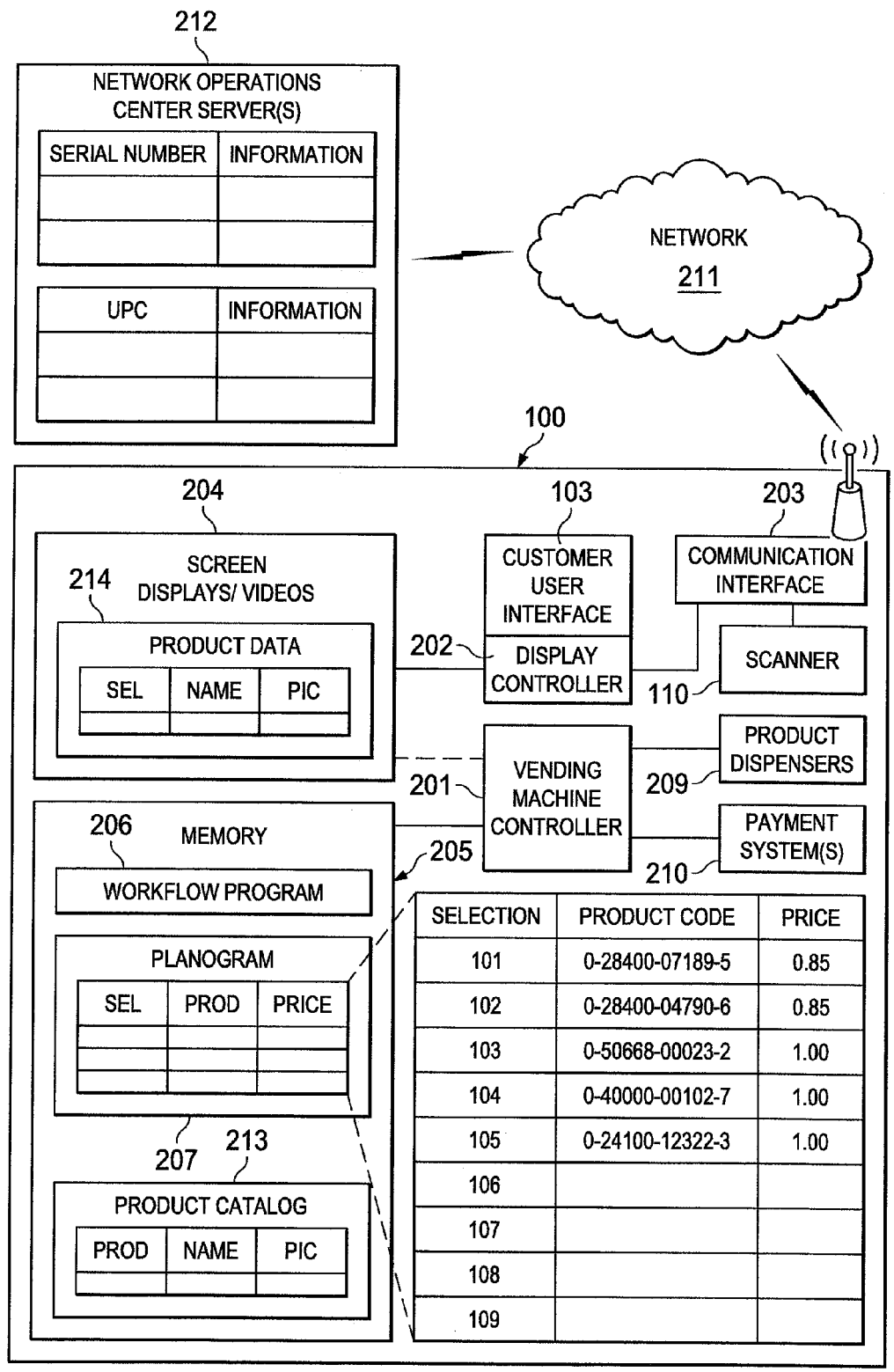
FIG. 2 is a block diagram of a communication and control system within and including a vending machine implementing automatic planogram programming using product, tray and price barcodes according to one embodiment of the present disclosure.

FIG. 2 is a block diagram of a communication and control system within and including a vending machine implementing automatic planogram programming using product, tray and price barcodes according to one embodiment of the present disclosure. Vending machine 100 includes a programmable vending machine controller (VMC) 201 of the type known in the art. Coupled to and communicating with VMC 201 is a display controller 202 for the customer user interface 103. The display controller 202 renders content for display on the customer user interface 103 and detects customer contact with the touch screen for the customer user interface 103. Suitable touch-screen display devices and the associated controllers for use as customer user interface 103 and display controller 202 are known in the art.

VMC 201 is also coupled to and communicates with a communication interface 203 enabling data transfer to external devices, such as a handheld computer, a network operations center or another vending machine. Communication may be by wireless data transfer or through an access port (e.g., Universal Serial Bus or "USB") provided in the vending machine 100, as known in the art. Communication with devices external to the vending machine 100 allows for update of the screen displays and/or videos employed during a vend transaction, for update of the programming of the vending machine 100 or download of operational data such as sales, remaining inventory or the operational status of various subsystems, or for the coordinated and common operation of multiple vending machines. Communication interface 203 includes the USB connection and USB HID interface for a handheld scanner, described above.

At least the display controller 202 and optionally also the VMC 201 are coupled to and communicate with a memory 204 containing the screen displays and/or videos rendered on the customer user interface 103 during a vend transaction and between transactions. Vending machine controller 201 is coupled to or includes another memory 205 used to control a process flow for vend transactions. While depicted as separate from VMC 201, memory 205 may actually be implemented within the same integrated circuit as VMC 201. Memory 205 stores the workflow program 206 used to control the vending machine's operations during a vend transaction, and the planogram 207 of products within the vending machine. In the exemplary embodiment, the products are organized by selection indicator.

Vending machine controller 201 is also coupled to and communicates with one or more product dispensers 209 (e.g., helical coils or an X-Y product retrieval mechanism) and payment systems 210 such as any combination of a coin mechanism, a bill validator or recycler, and a magnetic stripe card reader. VMC 201 receives signals from and/or controls the operation of product dispensers 209 and payment systems 210 during vend transactions.

Vending machine 100 is coupled by communications interface 203 to a network 211, which is in turn connected to one or more network operations center servers 212 for the enterprise operating vending machine 100. Portions of the communications path between vending machine 100 and network operations center servers 212 may be wireless or landline, and the complete communications path may include both forms of communications media. Portions of the communications path may extend over the Internet and may be secured in any of a variety of known manners, such as use of a Virtual Private Network (VPN).

Those skilled in the art will recognize that the complete structure and operation of a vending machine is not depicted or described herein. Instead, for simplicity and clarity, only so much of the complete structure and operation of a vending machine as is unique to the present disclosure or necessary for an understanding of the present disclosure is depicted and described.

Figure 4:
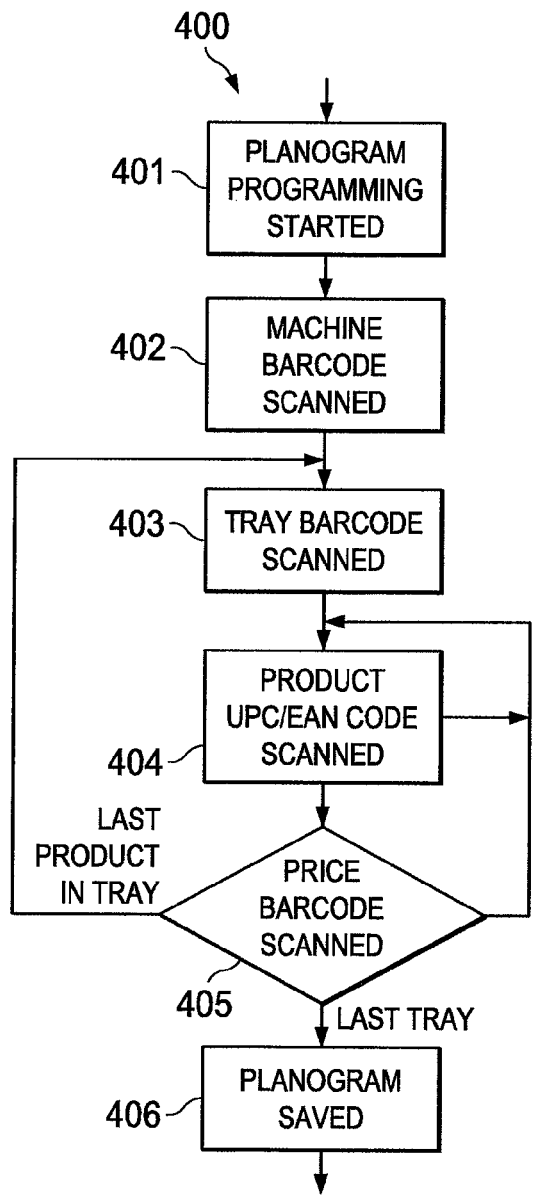
FIG. 4 is a high level flowchart for a process of automatic planogram programming using product, tray and price barcodes according to one embodiment of the present disclosure.

FIG. 4 is a high level flowchart for a process of automatic planogram programming using product, tray and price barcodes according to one embodiment of the present disclosure. The process 400 assumes that driver is fully stocking all selections with product, and is depicted for glass-front snack, cold drink (non-stack) or combo vending machines. The route driver opens the vending machine service door 102 and connects barcode scanner 110 to the USB port for the VMC 201 and retrieves the laminated sheet with barcoded prices hanging from chain inside the service side of the cabinet (behind service door). A "scanner hook" bracket on the inside of the service door may be provided for holding the scanner when not in use. The route driver initiates planogram programming (step 401) by entering a security code on the touchscreen for the customer interface to enter a service menu application, navigating the service menus to "Product Configuration"→"Clear Planogram Data," then presses "Yes" to confirm and selects "Product Configuration"→"Restock Machine"→"With Barcode Scanner" so that the screen displays "Waiting for scan data . . . ."

The route drive optionally first scans a vending machine barcode (step 402) uniquely identifying the vending machine, located at a position accessible once the service door is open, preferably on the board holding the vending machine controller. The vending machine barcode has a portion uniquely identifying the vending machine, such as by a combination of the manufacturer, model number and serial number. The unique portion of the vending machine barcode should thus encode the brand/type/model of the vending machine, allowing network operations center servers 212 to lookup that information using the vending machine barcode. Tray/shelf configuration information regarding the vending machine may also be appended to the manufacturer, model number and serial number, or otherwise contained within or accessible using the vending machine barcode. Alternatively, tray/shelf configuration information may be automatically determined during planogram programming as described below.

The route driver fully stocks the first tray with product. In most snack machines, the tray may be left "pulled out" for ease of access to back of product packaging, while in a cold drink machine the front row of products (bottles/cans) may be left with barcode symbol facing outward. The route driver then begins automatically programming the planogram by scanning the barcode affixed to first tray (step 402), causing the screen to be updated to show "Tray 1" at top and a list of all available selection codes down the left side for each available position, with empty product and price mappings (similar to the table shown in FIG. 2). The VMC beeps once to indicate a successful scan, and the route driver scans barcode of the product in first selection on the tray (step 403) so that the screen is updated to show the UPC code of scanned product. If the corresponding product is currently available in the vending machine's product database, the VMC beeps once and places a green "check mark" symbol beside UPC code on screen. Otherwise, the VMC beeps two times and places a red "?" beside UPC code on screen—not necessarily to indicate an error, but to indicate at least that the vending machine may not have product nutritional information, product image, or similar information for the product available.

The route driver then scans barcode on price sheet that corresponds to price for product in first selection (step 404), and the screen is updated to show price for product in current selection, with the VMC beeping once to indicate a successful scan. The route driver then sequentially scans the UPC codes for the remaining products within progressively higher-numbered selections on the tray, and the corresponding product price. Each product UPC code must be scanned in the order of selections on the tray. However, if the price for the current product is identical to the previous price, the barcoded price sheet does not need to be scanned. In this manner, the difference in the barcode format used for prices form the UPC/EAN barcodes on product packaging speeds the planogram programming process by allowing automatic discrimination between product and price barcodes (and between product and tray barcodes and tray and price barcodes). The VMC beeps once for each successful product scan, or twice for an unknown product, and the screen display is updated for each subsequent product just as for the first.

When finished with a tray, the tray is repositioned back into the vending machine cabinet (for snack vending machines) and/or cans/bottles are turned to re-face them in proper sales orientation (for cold drink or combo machines), with the product label facing forward. The route driver has the option to review and modify tray programming on screen before moving to next tray, by touching ("clicking") a selection number or product UPC code to enable rescanning of the UPC code for that product. Likewise touching the price for a particular product on the display screen allows the price to either be rescanned, or entered manually on a pop-up numeric keypad on the touchscreen. However, no action need be taken by the route driver if all programming for the current tray is correct.

The route driver repeats the stocking and programming process described above on each subsequent tray. No action is needed to advance to the next tray other than scanning the next tray barcode. Advantageously, trays need not be stocked and/or programmed in any particular order—the need for conforming to a particular order applies to selection order on each tray. Scanning a new tray barcode before all selections are entered on the current tray terminates programming on the current tray. Once all trays have been programmed, the route driver exits the programming processing (step 405) with the planogram saved to the vending machine and optionally automatically saved to a portable data storage device and/or transmitted to a network operations center.

Vending machine 100 optionally includes a catalog 213 of product information accessible by UPC or EAN code and containing at least the product name and an image of the product for display on the customer user interface 103. Preferably the catalog 213 also includes nutritional information, or a link to access nutritional information.

Concurrently with or following planogram programming of a tray as described above, selected product information 214 from the product catalog 213 is copied or linked to the screen displays/videos store 204, in a position index by the product selection. The name of the product and an image of the product may then be displayed during the vend transaction. If product data is not available for a particular product, the associated name, image and nutritional information may be retrieved from the network operations center servers 212.

Route drivers often need to make adjustments to the product configuration in the machines as a result of being out-of-stock of some particular product. In such situations—and also particularly when the planogram is programmed for the first time, the product catalog 213 currently loaded in the vending machine 100 may not include a product that is being substituted for another. When the procedure to update planogram configuration described above is followed, the vending machine 100 should automatically download the associated product data 214 for the new stock items, to both the product catalog 213 and, if separately copied, screen displays/videos store 204.

In order to avoid forcing the route driver to wait for a download to complete, the vending machine 100 could perform a "background" download, with an appropriate "download in progress" message displayed in lieu of actual product data to communicate to the driver that the machine is successfully fetching new product data. Alternatively, download of new product data may be deferred until the service door is closed, but before placing the vending machine back into operation. In either manner, the driver can continue on with other tasks without being forced to wait for the product data download to complete. When successfully downloaded, the machine will then automatically use and display the new product data.

If the vending machine is not connected to a network operations center server, the vending machine may display a "Machine offline—please insert product catalog media" message. When the route driver has finished scanning all barcodes for products as described above, the USB scanner is disconnected and a USB memory containing a full copy of the operator's product catalog is connected, allowing the vending machine to update catalog 213 with any new data needed.

The present disclosure describes automatic planogram programming using tray and price barcodes and product UPC or EAN codes scanned by a handheld scanner. The planogram for the entire vending machine may be quickly and accurately programmed, and changes to products or prices associated with a given selection may be readily made during subsequent restocking visits by the route driver.

In connection with the claims below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases may have been provided throughout this patent document, and those of ordinary skill in the art will understand that in many, if not most instances, such definitions apply to prior, as well as future uses of such defined words and phrases.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A vending machine, comprising:
    a memory configured to store a planogram for the vending machine;
    a plurality of trays each including a tray barcode unique to that tray among the trays within the vending machine;
    a set of price bar codes, each price bar code corresponding to a price within a group of selected prices; and
    a vending machine controller configured to communicably couple to a barcode scanner, wherein the vending machine controller is configured to, insert values within product and price entries for a selection in the planogram stored within the memory in response to receiving information corresponding to a tray barcode for a tray, a product code for products loaded within each selection on the corresponding tray, and at least one of the price barcodes.

2. The vending machine according to claim 1, wherein the product codes are product Universal Product Codes (UPCs) or European Article Number (EAN) codes, and wherein the vending machine controller is configured to prompt a user to scan, with the barcode scanner, the tray barcode and then sequentially the product UPCs or EAN codes for the products loaded within the each selection on the corresponding tray, and the at least one price barcode.

3. The vending machine according to claim 2, wherein the vending machine controller is configured to prompt the user to scan, with the barcode scanner, each product UPC or EAN code for one of the products loaded within a selection on the corresponding tray and one of the price barcodes.

4. The vending machine according to claim 3, wherein the vending machine controller is configured to prompt the user to scan, with the barcode scanner, one of the price barcodes for each product selection on the tray.

5. The vending machine according to claim 2, wherein the vending machine controller is configured to prompt the user to scan, with the barcode scanner, a predetermined number of tray barcodes.

6. The vending machine according to claim 2, wherein the vending machine controller is configured to prompt the user to scan, with the barcode scanner, a predetermined number of the product UPCs or EAN codes following scanning of a tray barcode.

7. The vending machine according to claim 2, wherein the vending machine controller is configured to determine a number of product selections on the tray from a number of the product UPCs or EAN codes scanned between scanning of the barcode for the tray and scanning of the barcode for a next tray.

8. The vending machine according to claim 2, wherein the vending machine controller is configured to use, in the planogram, a price corresponding to a first scanned price barcode for each product selection corresponding to the product UPCs or EAN codes scanned between scanning of the first scanned price barcode and subsequent scanning of a second scanned price barcode.

9. The vending machine according to claim 2, wherein the vending machine controller is configured to populate planogram data for a predetermined number of product selections within the vending machine.

10. The vending machine according to claim 2, wherein the vending machine controller is configured to prompt the user to scan, with the barcode scanner, a tray barcode for each tray within the vending machine.

11. A method of populating data in a vending machine planogram, comprising:
    receiving an electrical signal from a barcode scanner representing information corresponding to a tray barcode for a tray within a plurality of trays each including a tray barcode unique to that tray among the trays within the vending machine within the vending machine;
    receiving an electrical signal from a barcode scanner representing information corresponding to a product code for products loaded within each selection on the corresponding tray;
    receiving an electrical signal from a barcode scanner representing information corresponding to at least one of a set of price bar codes, each price bar code corresponding to a price within a group of selected prices; and
    inserting into a planogram for the vending machine stored within a memory in the vending machine values within product and price entries for a selection in the planogram stored within the memory.

12. The method according to claim 11, wherein the product codes are product Universal Product Codes (UPCs) or European Article Number (EAN) codes, and further comprising:
    prompting a user to scan, with a barcode scanner connected to the vending machine, the tray barcode and then sequentially the product UPCs or EAN codes for the products loaded within the each selection on the corresponding tray, and the at least one price barcode.

13. The method according to claim 12, further comprising:
    prompting the user to scan, with the barcode scanner, each product UPC or EAN code for one of the products loaded within a selection on the corresponding tray and one of the price barcodes.

14. The method according to claim 13, further comprising:
    prompting the user to scan, with the barcode scanner, one of the price barcodes for each product selection on the tray.

15. The method according to claim 12, further comprising:
    prompting the user to scan, with the barcode scanner, a predetermined number of tray barcodes.

16. The method according to claim 12, further comprising:
    prompting the user to scan, with the barcode scanner, a predetermined number of the product UPCs or EAN codes following scanning of a tray barcode.

17. The method according to claim 12, further comprising:
    determining a number of product selections on the tray from a number of the product UPCs or EAN codes scanned between scanning of the barcode for the tray and scanning of the barcode for a next tray.

18. The method according to claim 12, further comprising:
    using, in the planogram, a price corresponding to a first scanned price barcode for each product selection corresponding to the product UPCs or EAN codes scanned between scanning of the first scanned price barcode and subsequent scanning of a second scanned price barcode.

19. The method according to claim 12, further comprising: populating planogram data for a predetermined number of product selections within the vending machine.

20. The method according to claim 12, further comprising: prompting the user to scan, with the barcode scanner, a tray barcode for each tray within the vending machine.

* * * * *